United States Patent
Bade et al.

(10) Patent No.: US 8,185,750 B2
(45) Date of Patent: May 22, 2012

(54) METHOD FOR EXTENDING THE CRTM IN A TRUSTED PLATFORM

(75) Inventors: Steven A. Bade, Georgetown, TX (US); Ronald Perez, Mount Kisco, NY (US); Leendert Peter Van Doorn, Valhalla, NY (US); Helmut H. Weber, Dettenhausen (DE)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 12/059,274

(22) Filed: Mar. 31, 2008

(65) Prior Publication Data

US 2008/0184040 A1    Jul. 31, 2008

Related U.S. Application Data

(63) Continuation of application No. 10/887,441, filed on Jul. 8, 2004, now abandoned.

(51) Int. Cl.
   *G06F 12/14*   (2006.01)
   *G06F 21/22*   (2006.01)
(52) U.S. Cl. .............................. 713/191; 713/2; 713/189
(58) Field of Classification Search .................. 713/1–2, 713/161, 167, 176, 180; 717/126, 140, 148
See application file for complete search history.

(56) References Cited

U.S. PATENT DOCUMENTS

| | | | | |
|---|---|---|---|---|
| 5,448,045 A | * | 9/1995 | Clark ............................ | 235/382 |
| 6,625,730 B1 | * | 9/2003 | Angelo et al. .................... | 713/2 |
| 2002/0194482 A1 | | 12/2002 | Griffin et al. | |
| 2003/0028772 A1 | | 2/2003 | Allison et al. | |
| 2003/0191940 A1 | | 10/2003 | Sinha et al. | |
| 2003/0233558 A1 | * | 12/2003 | Lieberman et al. ........... | 713/189 |
| 2004/0015724 A1 | | 1/2004 | Pham et al. | |
| 2004/0250086 A1 | | 12/2004 | Maucher | |

OTHER PUBLICATIONS

Maruyama, Hiroshi et al. Linux with TCPA Integrity Measurement. RT0507 Security Reasearch Report. Jan 28, 2003[online], [retrieved on 2009-111-03]. Retrieved from the Internet. Google Scholar.*
TCG PC Specific Implementation Specifications [online], Aug. 18, 2003[retreived on Nov. 1, 2011] Google.*
www.johnmarchesini.com <retrieved on Jul. 6, 2011>.*
Experimenting with TCPA/TCG Hardware Or: How IU Learned to Stop Worrying and Love The Bear. Marchesini et al. 2003.<Retreived on Jul. 6, 2011>.*
TCG Specifications<Retrieved on Jul. 6, 2011>.*

* cited by examiner

*Primary Examiner* — Minh Dinh
*Assistant Examiner* — Venkat Perungavoor
(74) *Attorney, Agent, or Firm* — Yudell Isidore Ng Russell PLLC

(57) ABSTRACT

A method, system and computer program product for enhancing the functionality of the existing core root of trust measurement (CRTM). The CRTM is extended to allow platform manufacturer controlled and certified code to be incorporated into the function of the CRTM, wherein the manufacturer may define the policy for accepting a new function into the CRTM. When a firmware or software module image is compiled, the build process generates a hash value of the compiled firmware or software image, wherein the hash value reflects a fingerprint (or short hand) representation of the compiled image. A determination is made as to whether the hash value of the firmware or software image is to be a CRTM extension. If so, a digital signature of the module is created using the CRTM extension private key. This signature value is added to the firmware or software module.

20 Claims, 4 Drawing Sheets

METHOD FOR EXTENDING THE CRTM IN A TRUSTED PLATFORM

This application is a continuation of application Ser. No. 10/887,441, filed Jul. 8, 2004, now abandoned.

BACKGROUND OF THE INVENTION

1. Technical Field

The present invention relates generally to an improved data processing system. In particular, the present invention relates to a method, apparatus, and computer instructions for extending the core root of trust for measurement (CRTM) in a trusted platform.

2. Description of Related Art

Most data processing systems contain sensitive data and sensitive operations that need to be protected. For example, the integrity of configuration information needs to be protected from illegitimate modification, while other information, such as a password file, needs to be protected from illegitimate disclosure. As another example, a data processing system needs to be able to reliably identify itself to other data processing systems.

An operator of a given data processing system may employ many different types of security mechanisms to protect the data processing system. For example, the operating system on the data processing system may provide various software mechanisms to protect sensitive data, such as various authentication and authorization schemes, while certain hardware devices and software applications may rely upon hardware mechanisms to protect sensitive data, such as hardware security tokens and biometric sensor devices.

The integrity of a data processing system's data and its operations, however, centers on the issue of trust. A data processing system's data and operations can be verified or accepted by another entity if that entity has some manner for establishing trust with the data processing system with respect to particular data items or particular operations.

Hence, the ability to protect a data processing system is limited by the manner in which trust is created or rooted within the data processing system. To address the issues of protecting data processing systems, a consortium of companies has formed the Trusted Computing Group (TCG) to develop and to promulgate open standards and specifications for trusted computing. According to the specifications of the Trusted Computing Group, trust within a given data processing system or trust between a data processing system and another entity is based on the existence of a hardware component within the data processing system that has been termed the trusted platform module (TPM).

A trusted platform enables an entity to determine the state of the software environment in that platform and to seal data to a particular software environment in that platform. The entity deduces whether the state of the computing environment in that platform is acceptable before performing a transaction with that platform. To enable this, the trusted platform provides integrity metrics, also known as integrity measurements, to the entity that reflects the integrity of the software state of the trusted platform, and the integrity measurements require a root of trust within the computing platform. In order for a system to be a trusted platform, the integrity measurements must be taken from the core root of trust for measurement (CRTM) and extended through the initial program load (IPL) process up to the point at which the operating system is initialized.

Trusted computing platforms predicate the start of execution from the CRTM. CRTM is a component of a trusted platform system and provides secure measurement functions to the rest of the platform. CRTM is essentially the first piece of code that executes on a platform at boot time. The CRTM builds a chain of hash codes for each portion of the boot. The CRTM then reports to the TPM what software executes after the CRTM executes. In addition, as the CRTM is required to be an immutable portion of the platform's initialization code, the CRTM is changeable only by a platform manufacturer approved methodology or process. Thus, only code that is owned and controlled by the platform manufacturer will meet the requirements for updating the CRTM.

Existing methods for updating the CRTM are predicated on unique processor instruction architectural elements. For example, Intel Corporation has introduced an SMX mode which allows for the "late instantion of a hypervisor type function". A hypervisor is a trusted firmware component and is used to create multiple, isolated, high-integrity supervisor program environments. The processor (firmware, etc.) verifies this "hypervisor" before giving control to the BIOS. Consequently, the Intel model adds additional complexity to the processor architecture. In addition, the Intel model facilitates the extension of the CRTM with code that is not under manufacturer control. Thus, the Intel model does not provide an extension of the CRTM, but rather it provides mechanism for instantiating a replacement CRTM for one set of execution models.

Therefore, it would be advantageous to have a mechanism for enhancing the functionality of the existing CRTM by allowing platform manufacturer controlled and certified code to be incorporated into the function of the CRTM.

SUMMARY OF THE INVENTION

The present invention provides a method, system and computer program product for enhancing the functionality of the existing core root of trust for measurement (CRTM). With the present invention, the CRTM is extended to allow platform manufacturer controlled and certified code to be incorporated into the function of the CRTM, wherein the manufacturer may define the policy for accepting a new function into the CRTM. When the processor initializes the data processing system, the firmware or software module image is compiled. The build process then generates a hash value of the firmware or software it is measuring, the hash value representing a fingerprint, or shorthand representation, of the module that is compiled. A determination is then made as to whether the hash value of the firmware or software image are to be a CRTM extension. If so, a digital signature of the module is created using the CRTM extension private key. This signature value is then added to the firmware or software module.

When a module is loaded into the data processing system, the CRTM determines if the module is signed by a core root of trust measurement extension signing key. If so, the CRTM validates the module signature against the public key of the manufacturer. The CRTM then creates an entry in a platform configuration register, wherein the platform configuration register is extended to include functions of the core root of trust measurement and may be used to reflect that the CRTM has been extended.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
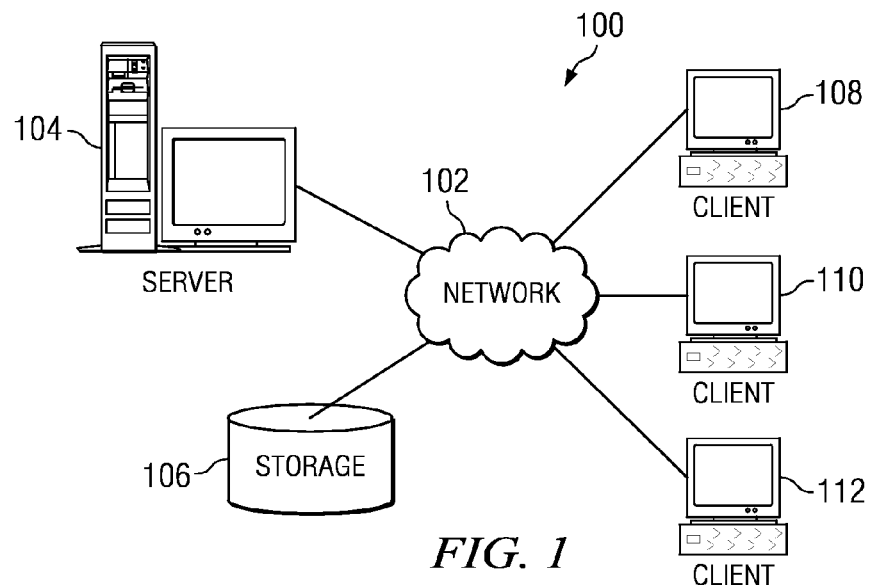
FIG. 1 depicts a representation of a network of data processing systems in which the present invention may be implemented.

With reference now to the figures, FIG. 1 depicts a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers or personal digital assistants (PDA) devices. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
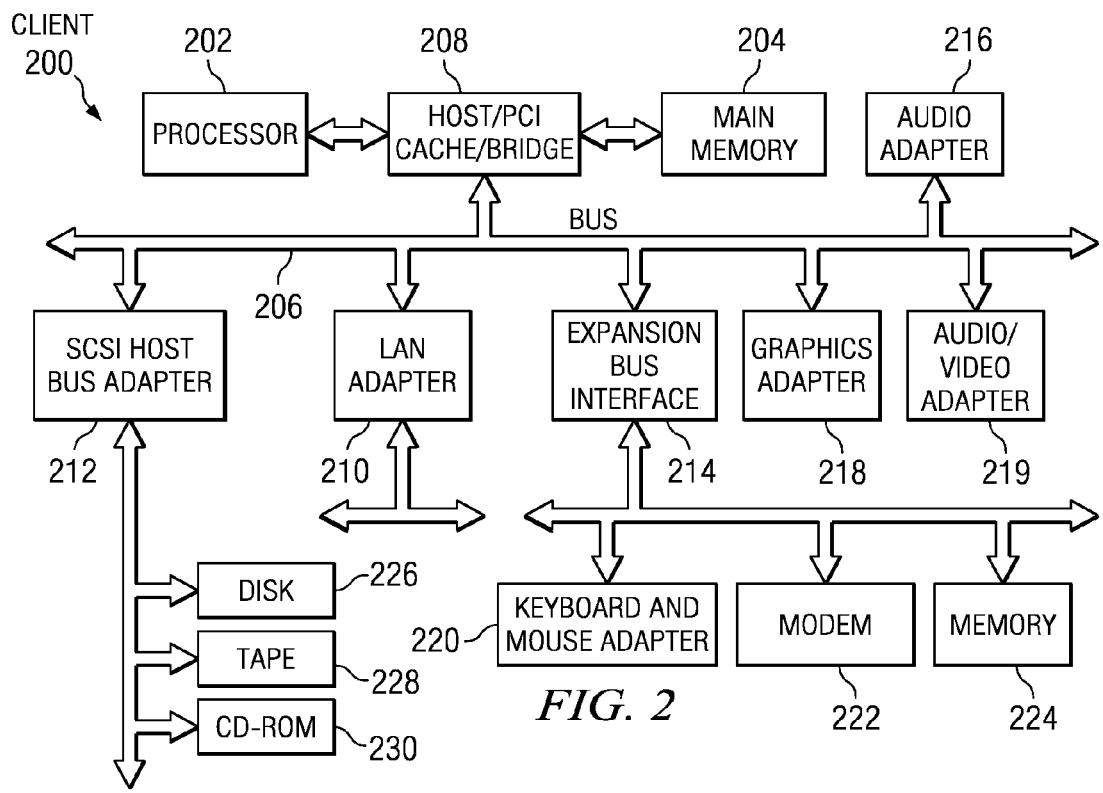
FIG. 2 is a block diagram of a data processing system that may be implemented as a server in accordance with a preferred embodiment of the present invention.

With reference now to FIG. 2, a block diagram illustrating a data processing system is depicted in which the present invention may be implemented. Data processing system 200 is an example of a client computer, such as clients 108, 110, and 112 shown in FIG. 1. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. Small computer system interface (SCSI) host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as Windows XP, which is available from Microsoft Corporation. An object oriented programming system such as Java may run in conjunction with the operating system and provide calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

The depicted example in FIG. 2 and above-described examples are not meant to imply architectural limitations. In addition, the examples of the present invention herein below employ the terminology and examples from the standards and/or specifications that have been promulgated by the Trusted Computing Group (TCG); it should be noted, however, that the examples are not meant to imply architectural, functional, nor definitional limitations with respect to embodiments of the present invention.

The present invention allows for enhancing the functionality of the existing CRTM. The mechanism of the present invention extends the CRTM by allowing platform manufacturer controlled and certified code to be incorporated into the function of the CRTM. Thus, the extended CRTM contains code that is owned and controlled by the platform manufacturer, which meets the requirements to update the CRTM. In this manner, the extended CRTM may be updated using a manufacturer defined policy. In addition, the extension of the CRTM is reflected in the system's state by extending the platform configuration register (PCR) to where the CRTM is measured.

Each processor comprises a core root of trust for measurement (CRTM), such as CRTM 330 in FIG. 3 described below. A trusted platform starts execution from its core root of trust for measurement, thereby forming the basis or root for trusting the integrity of the software execution state within the trusted platform. The software that the CRTM loads and executes is measured and logged, thereby contributing to the trusted platform's integrity measurements. An integrity measurement is data that reflects the integrity of the software state on a trusted platform. Each subsequent software element or configuration element is measured before execution control is passed. The collective chain of measurements represents the integrity of the trusted platform. A representation of the chain of integrity measurements is stored within the trusted platform module in association with a log of every relevant event.

When the processor initializes the data processing system, the firmware or software module within the trusted platform module is compiled. The build process measures integrity metrics by generating a hash of the firmware or software it is measuring. A determination is made as to whether the firmware or software image is to be a CRTM extension. If so, a digital signature of the firmware or software module is created using the CRTM extension private key. This signature block is then added to the firmware module.

When the new firmware or software module is loaded by the CRTM, the CRTM executing on the processor determines whether the firmware or software module is signed. If a signature is found, the base CRTM validates the signature against the public portion of the CRTM extension key of the manufacturer. If the module is signed by the CRTM extension private key, an entry is made in the platform configuration register (PCR), which contains a representation of the "chain" of integrity measurements. The PCR is a storage location that reflects the aggregate of the system measurement stated. The PCR as an aggregate is used to protect the integrity of the measurement log which contains the discrete measurement events.

Figure 3:
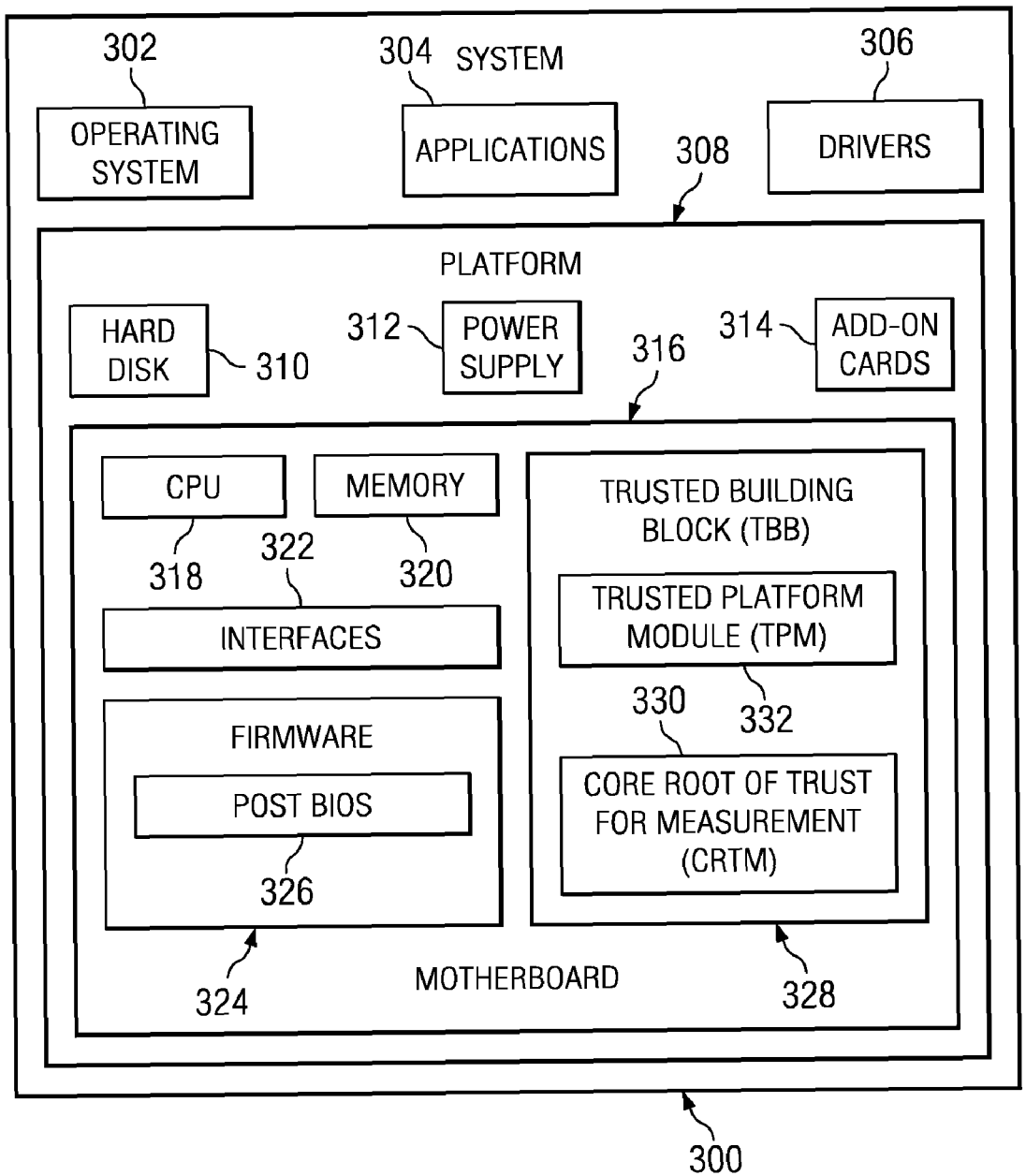
FIG. 3 is a block diagram of a known trusted platform architecture.

With reference now to FIG. 3, a block diagram depicts some of the components in a data processing system constructed using a model of a trusted platform architecture. Trusted platform architectures may be implemented for particular computational environments or for particular classes of devices; FIG. 3 depicts a trusted platform architecture in accordance with the TCG's PC-specific implementation specification.

System 300 supports execution of software components, such as operating system 302, applications 304, and drivers 306, on its platform 308. The software components may be received through a network, such as network 102 shown in FIG. 1, or may be stored, for example, on hard disk 310. Platform 308 receives electrical power from power supply 312 for executing the software components on add-on cards 314 and motherboard 316, which includes typical components for executing software, such as CPU 318 and memory 320, although motherboard 316 may include multiple CPU's. Interfaces 322 connect motherboard 316 to other hardware components within system 300, and firmware 324 contains POST BIOS (power-on self-test basic input/output system) 326.

Motherboard 316 also comprises trusted building block (TBB) 328; motherboard 316 is supplied by a manufacturer with TBB 328 and other components physically or logically attached and supplied by the manufacturer. TBB 328 comprises the combination of the core root of trust for measurement (CRTM) component 330, the trusted platform module (TPM) 332, the connection of the CRTM to motherboard 316, and the connection of the TPM to motherboard 316.

TPM 332 is explained in more detail with respect to FIG. 3 herein below. CRTM 330 is an immutable portion of the platform's initialization code that executes upon a platform reset; the platform's execution must begin at the CRTM upon any platform reset event. In this manner, the trust in the platform is based on the CRTM and the behavior of the TPM, and the trust in all measurements is based on the integrity of the CRTM. In the depicted example in FIG. 3, the BIOS may be assumed to include a BIOS Boot Block and POST BIOS 326; each of these are independent components that can be updated independent of each other, wherein the manufacturer must control the update, modification, and maintenance of the BIOS Boot Block, but a third party supplier may update, modify, or maintain the POST BIOS component. In the depicted example in FIG. 3, the CRTM may be assumed to be the BIOS Boot Block, and the POST BIOS is a measured component of the chain of trust. Alternatively, the CRTM may comprise the entire BIOS.

Figure 4:
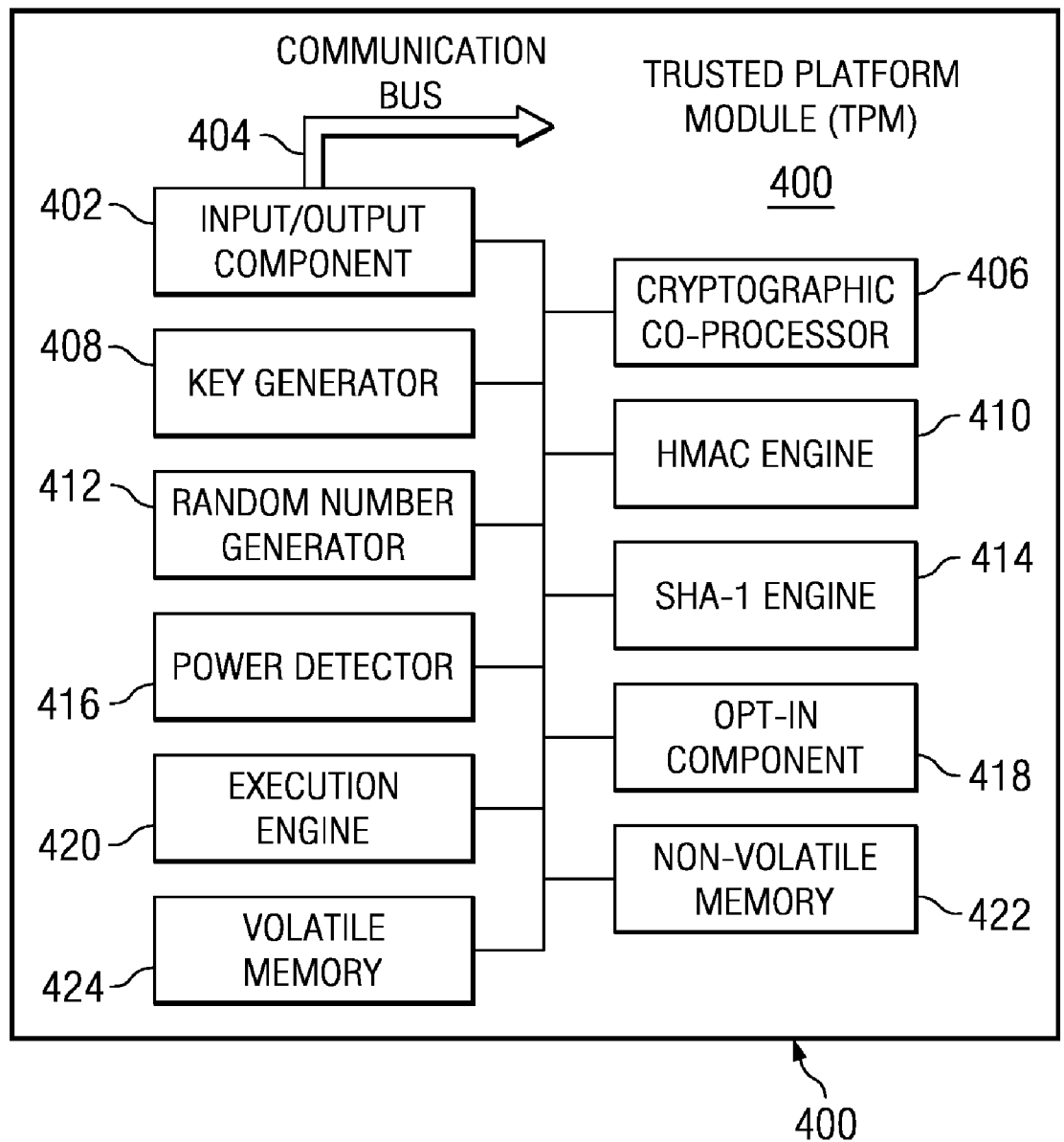
FIG. 4 is a block diagram illustrating some of the major components of a known trusted platform module.

Turning now to FIG. 4, a block diagram of a known trusted platform module is shown. FIG. 4 illustrates components of a trusted platform module according to TCG specifications. Trusted platform module 400 comprises input/output component 402, which manages information flow over communications bus 404 by performing appropriate protocol encoding/decoding operations and routing of messages to appropriate components. Cryptographic co-processor 406 performs cryptographic operations within a trusted platform module. Key generator 408 creates symmetric keys and RSA asymmetric cryptographic key pairs. HMAC engine 410 performs HMAC (Keyed-Hashing for Message Authentication) calculations, whereby message authentication codes are computed using secret keys as integrity checks to validate information transmitted between two parties, e.g., in accordance with Krawczyk et al., "IHMAC: Keyed-Hashing for Message Authentication", Request for Comments (RFC) 2104, Internet Engineering Task Force (IETF), February 1997.

Random number generator 412 acts as a source of randomness for the computation of various values, such as keys or other values. SHA-1 engine 414 implements the SHA-1 hash algorithm. Power detector 416 manages the power states of a trusted platform module in association with the power states of the platform. Opt-in component 418 maintains the state of persistent and volatile flags and enforces semantics associated with those flags such that the trusted platform module may be enabled and disabled. Execution engine 420 runs program code to execute commands that the trust platform module receives through input/output component 402. Non-volatile memory 422 stores persistent identity and state associated with the trusted platform module; the non-volatile memory may store static data items but is also available for storing dynamic data items by entities that are authorized by the trusted platform module owner, whereas volatile memory 424 stores dynamic data items.

Figure 5:
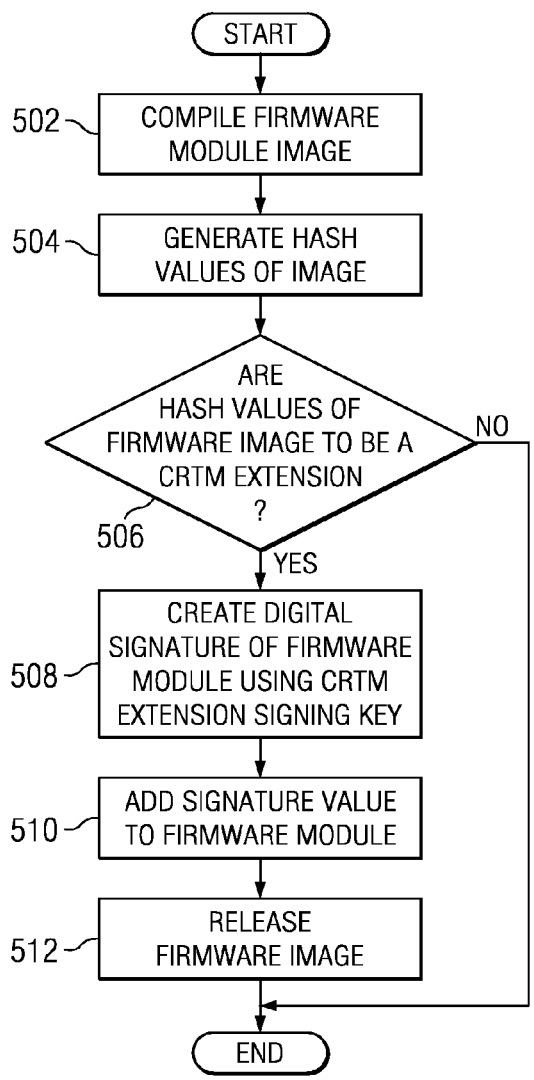
FIG. 5 is a flowchart of a process for facilitating the creation of an extension of the CRTM in accordance with a preferred embodiment of the present invention.

FIG. 5 is a flowchart of a process for facilitating the creation of an extension of the CRTM in accordance with a preferred embodiment of the present invention by allowing the platform manufacturer to utilize a digital signature block to indicate to the executing CRTM that a new function is an extension of the CRTM. FIG. 5 represents a process that is done within the platform manufacturer's environment, and may be implemented in a data processing system, such as data processing system 200 in FIG. 2. It should be noted that in the steps embodied in FIG. 5, there is no policy decision being made.

The process begins with compiling the firmware or software module (step 502). As a manufacturer controlled process, the compiling of the firmware or software module is independent of the CRTM or other aspects of trusted computing. Next, using the firmware image compiled in step 502, the build process generates a hash value of the firmware image (step 504). The hash value provides a fingerprint, or shorthand representation, of the module image. A determination is then made as to whether the hash of the firmware image is to be an extension of the CRTM (step 506). If not, the firmware is released (shipped) (step 512).

In contrast, if the firmware is to be a CRTM extension, the build process uses a CRTM extension private key to create the digital signature of the firmware module (step 508). This signature value is attached to the module (step 510) and the firmware is released (shipped) (step 512).

Figure 6:
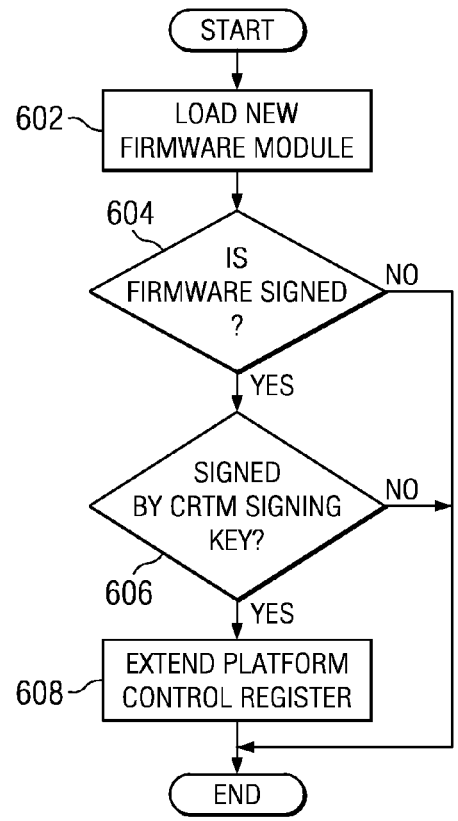
FIG. 6 is a flowchart of a process for applying standard digital signature techniques for validating the signature in accordance with a preferred embodiment of the present invention.

Turning now to FIG. 6, a flowchart is shown of a process for applying standard digital signature techniques for validating the signature in accordance with a preferred embodiment of the present invention, wherein the signature is embedded in the module. This process allows a core root of trust measurement within a trusted computing platform to validate a module signature against a public key of a manufacturer. In this process, the base CRTM contains the CRTM extension public key value. In addition, the process illustrated in FIG. 6 may be implemented in a data processing system, such as data processing system 200 in FIG. 2.

The process begins with the loading of the new firmware module by the CRTM (step 602). The CRTM executing on the processor then determines whether the firmware or software module is signed (step 604). For instance, as described in step 512 in FIG. 5, the module may be digitally signed by the manufacturer, and the signature embedded in the module. The CRTM checks the module to see if it contains such a signature.

If a signature is found, the base CRTM validates the signature against the public portion of the CRTM extension key of the manufacturer (step 606). This step is performed by determining if the module is signed by the CRTM extension private key. If the module is signed by the CRTM extension private key, an entry is made in the platform configuration register (PCR) (step 608), with the process continuing thereafter. PCRs contain values representing a sequence of measurements (although not the actual integrity metrics). For instance, PCR(0) may be extended to include an additional function within the CRTM. In other words, PCR(0) is a platform extension, and may be used to reflect that the CRTM has been extended to another module.

Turning back to step 604, if a signature is not found, the module is executed, and the CRTM is not extended. Likewise, in step 606, if it is determined that the module is not signed by the CRTM extension private key, the module is executed and the CRTM is not extended.

In this manner, the proof of immutability is carried in the signature. The base CRTM is not required to provide (attackable) interfaces to update tables. Only the compromise of the platform manufacturer's signing key would allow an attacker to replace a module.

Thus, the present invention provides a method, apparatus, and computer instructions for enhancing the functionality of the existing core root of trust for measurement (CRTM). The advantages of the present invention should be apparent in view of the detailed description that is provided above. With the present invention, the CRTM is extended to allow platform manufacturer controlled and certified code to be incorporated into the function of the CRTM, wherein the manufacturer may define the policy for accepting a new function into the CRTM. Thus, the extended CRTM contains code that is owned and controlled by the platform manufacturer, which meets the requirements to update the CRTM. In this manner, the extended CRTM may be updated using a manufacturer defined policy.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A processor implemented method in a data processing system for extending a core root of trust for measurement within a trusted computing platform, comprising:
    responsive to compiling a module image within a manufacturing environment of the trusted computing platform, generating a hash value of the module image during a build process within the manufacturing environment of the trusted computing platform, wherein the hash value is generated from one or more metrics measured by the build process;
    determining if the hash value of the module image is to be an extension of a core root of trust for measurement;
    in response to determining that the hash value of the module image is to be an extension of the core root of trust for measurement:
    creating, within the manufacturing environment of the trusted computing platform, a digital signature for the module image using an extension private key of the core root of trust for measurement; and
    adding the digital signature to the module image within the manufacturing environment of the trusted computing platform-to allow platform manufacturer controlled and certified code to be incorporated into functions of the core root of trust for measurement based on a policy defined by the platform manufacturer for accepting a new function into the core root of trust for measurement.

2. The method of claim 1, further comprising:
    responsive to determining that the hash value of the module image is not to be an extension of the core root of trust for measurement, releasing the module image.

3. The method of claim 1, further comprising making an entry in a platform configuration register only after verifying that the module image is signed with the extension private key.

4. The method of claim 3, further comprising updating the extension and the core root of trust for measurement using a manufacturer defined policy.

5. The method of claim 1, wherein the module image is a firmware module.

6. The method of claim 1, wherein the module image is a software module.

7. A processor implemented method in a data processing system for validating a module signature against a public key of a manufacturer in a core root of trust for measurement within a trusted computing platform, the method comprising:
  loading a module into the data processing system; determining if the module contains a digital signature that was created by a core root of trust for measurement extension private key, wherein the digital signature indicates that the module was compiled and generated within a manufacturing environment of the trusted computing platform and signed by the extension private key of the core root of trust for measurement within the manufacturing environment of the trusted computing platform;
  responsive to determining that the module contains the digital signature that indicates that the module is signed by a core root of trust for measurement extension private key within the manufacturing environment of the trusted computing platform, validating the module signature against a public key of the manufacturer in a core root of trust for measurement within the trusted computing platform; and
  in response to the module signature being validated, extending a platform configuration register by creating an entry in the platform configuration register-to include functions of the extension of the core root of trust for measurement, based on a policy defined by the platform manufacturer for accepting a new function into the core root of trust for measurement.

8. A data processing system for extending a core root of trust for measurement within a trusted computing platform, comprising:
  a memory that contains computer executable instructions stored therein;
  a processor in communication with the memory, wherein the processor executes the computer executable instructions to direct the data processing system to:
    generate a hash value of a module image during a build process within a manufacturing environment of the trusted computing platform in response to the module image being compiled within the manufacturing environment of the trusted computing platform, wherein the hash value is generated from one or more metrics measured by the build process;
    determine whether the hash value of the module image is to be an extension of a core root of trust for measurement;
    in response to determining that the hash value of the module image is to be the extension of the core root of trust for measurement:
      create, within the trusted computing platform manufacturer's environment, a digital signature for the module image using an extension private key of the core root of trust for measurement; and
      add the digital signature to the module image, wherein adding the digital signature allows platform manufacturer controlled and certified code to be incorporated into functions of the core root of trust for measurement, and wherein adding the digital signature occurs within the trusted computing platform manufacturer's environment to provide a capability for the platform manufacturer to define a policy for accepting a new function into the core root of trust for measurement;
    wherein the module image is released with the digital signature added thereto to enable functions corresponding to the module image to be utilized as an extension of the core root of trust for measurement in response to the digital signature being verified against a public key of the manufacturer.

9. The data processing system of claim 8, wherein the processor further executes the computer executable instructions to direct the data processing system to:
  release the module image in response to determining that the hash value of the module image is not to be an extension of the core root of trust for measurement.

10. The data processing system of claim 8, wherein the processor further executes the computer executable instructions to direct the data processing system to:
  create an entry in a platform configuration register responsive to verifying that the module image is signed with the extension private key.

11. The data processing system of claim 10, wherein the processor further executes the computer executable instructions to direct the data processing system to:
  update the extension and the core root of trust for measurement may be updated using the manufacturer defined policy.

12. The data processing system of claim 8, wherein the module image is a firmware module.

13. The data processing system of claim 8, wherein the module image is a software module.

14. A computer program product embodied on a computer-readable device for extending a core root of trust for measurement within a trusted computing platform, the computer program product comprising:
  a computer readable device having computer executable instructions stored thereon, the computer executable instructions comprising: computer executable instructions for generating, during a build process within a manufacturing environment of the trusted computing platform, a hash value of a module image in response to compiling the module image within the manufacturing environment of the trusted computing platform, wherein the hash value is generated from one or more metrics measured by the build process;
  computer executable instructions for determining if the hash value of the module image is to be a core root of trust for measurement extension;
  computer executable instructions for in response to determining that the hash value of the module image is to be a core root of trust for measurement extension: creating, within the manufacturing environment of the trusted computing platform, a digital signature for the module using the core root of trust for measurement's extension private key; and
  adding the digital signature to the module within the manufacturing environment of the trusted computing platform, wherein adding the digital signature allows platform manufacturer controlled and certified code to be incorporated into functions of the core root of trust for measurement, and wherein the platform manufacturer defines a policy for accepting a new function into the core root of trust for measurement;
  wherein the module image is released with the digital signature added thereto to enable functions corresponding to the module image to be utilized as an extension of the core root of trust for measurement in response to the digital signature being verified against a public key of the manufacturer when the module image is loaded into a data processing system.

15. The computer program product of claim 14, further comprising computer executable instructions for releasing the module image in response to determining that the hash value of the module image is not to be the extension of the core root of trust for measurement.

16. The computer program product of claim 14, wherein the computer executable instructions for incorporating platform manufacturer controlled and certified code into the core root of trust for measurement further comprises computer executable instructions for creating an entry in a platform configuration register responsive to verifying that the module image is signed with the extension private key.

17. The computer program product of claim 16, wherein the extension of the core root of trust for measurement may be updated using the manufacturer defined policy.

18. The computer program product of claim 14, wherein the module image is a firmware module.

19. The computer program product of claim 14, wherein the module image is a software module.

20. The method of claim 1, further comprising releasing the module image with the digital signature added thereto to enable functions corresponding to the module image to be utilized as an extension of the core root of trust for measurement in response to the digital signature being verified against a public key of the manufacturer when the module image is loaded into a data processing system, wherein the digital signature us utilized by a platform manufacturer to indicate to an executing core root of trust for measurement that a new function is an extension of the core root of trust for measurement.

* * * * *